United States Patent [19]

Hirata

[11] 4,383,309

[45] May 10, 1983

[54] DISC-SHAPED RECORDING MEDIUM REPRODUCING APPARATUS

[75] Inventor: Atsumi Hirata, Fujisawa, Japan

[73] Assignee: Victor Company of Japan, Ltd., Yokohama, Japan

[21] Appl. No.: 244,674

[22] Filed: Mar. 17, 1981

[30] Foreign Application Priority Data

Mar. 18, 1980 [JP] Japan .................................. 55/34319

[51] Int. Cl.³ ............................................ G11B 17/04
[52] U.S. Cl. ...................................... 369/77; 369/219
[58] Field of Search ........................... 369/77, 219, 75

[56] References Cited

U.S. PATENT DOCUMENTS 4,124,866 11/1978 Coleman .............................. 369/77
4,133,540 1/1979 Torrington ........................... 369/77
4,150,833 4/1979 Yamamura .......................... 369/219

Primary Examiner—Steven L. Stephan
Attorney, Agent, or Firm—Louis Bernat

[57] ABSTRACT

A reproducing apparatus reproduces a disc-shaped recording medium which is accommodated within a case comprising a jacket which has a space for accommodating the disc-shaped recording medium and an opening for allowing the disc-shaped recording medium to go in and out of the jacket, and a lid member inserted through the opening of the jacket for closing the opening of the jacket, where the lid member having cutouts and rideover parts. The reproducing apparatus comprises an inserting opening through which the case is inserted, a turntable for rotating the disc-shaped recording medium, a clamping mechanism for clamping at least one of the disc-shaped recording medium and the lid member provided at an innermost part on the opposite side from the inserting opening with respect to the turntable, a lowering and raising mechanism for lowering the disc-shaped recording medium to a position where the disc-shaped recording medium is placed on the turntable from a clamping position where the disc-shaped recording medium is clamped by the clamping mechanism upon starting of the reproduction and raising the disc-shaped recording medium to the clamping position from the turntable upon finishing or discontinuing of the reproduction, a reproducing transducer for reproducing the disc-shaped recording medium placed on the turntable, moving mechanism for moving the reproducing transducer from a waiting position to a reproducing position with respect to the disc-shaped recording medium, a driving source for operating the moving mechanism, a mechanism for rotating the turntable after the disc-shaped recording medium is lowered and placed onto the turntable, and controlling mechanism for controlling the driving source to operate the moving mechanism at a speed selected from among a high speed, semi-high speed, and fast speed (where the high speed is the fastest speed, the semi-high speed is the second fastest speed, and the fast speed is the third fastest speed, and the fast speed is faster than the moving speed of the moving mechanism upon a quick-motion reproduction) according to the operation mode of the reproducing apparatus.

7 Claims, 3 Drawing Figures

DISC-SHAPED RECORDING MEDIUM REPRODUCING APPARATUS

BACKGROUND OF THE INVENTION

The present invention generally relates to disc-shaped recording medium reproducing apparatuses, and more particularly to a disc-shaped recording medium reproducing apparatus capable of placing and leaving a disc-shaped recording medium in a state possible for reproduction within the reproducing apparatus when a case having a lid for accommodating the disc-shaped recording medium therein is inserted into and then pulled out from within the reproducing apparatus, and constructed to select and change over the feeding speed of a reproducing transducer for reproducing the disc-shaped recording medium to a suitable speed according to the operational state of the reproducing apparatus.

Conventionally, in an apparatus for reproducing a disc-shaped recording medium (referring to video disc, PCM audio disc, and the like, and hereinafter simply referred to as a disc), there are types of apparatuses in which a disc is reproduced when the disc is loaded upon clamping and placing of the disc within the reproducing apparatus, by inserting into and then pulling out a disc case which has a lid and accommodates a disc therein, from within the reproducing apparatus. In this type of an apparatus, the clamping with respect to the disc is released, and the disc is placed on a turntable upon starting of the reproduction. Then, the reproducing apparatus performs such operations in which the turntable is rotated, and a reproducing transducer is moved to a reproduction starting position and the like from a waiting position.

In the above described reproducing apparatus, it is desirable not to rotate the turntable until the disc is placed on the turntable, and desirable to promptly place the disc on the turntable. Moreover, it is preferable for the rotational speed of the turntable to reach a rotational speed approximately equal to a predetermined rotational speed, before the reproducing transducer is fed to a reproduction starting position (lead-in position) at the outermost periphery of the disc after starting of the rotation of the turntable.

Furthermore, when discontinuing reproduction during a reproduction mode, it is desirable to return the reproducing transducer to the original waiting position where the reproducing transducer was positioned before starting of the reproduction, requiring approximately the same time even when the reproducing transducer is at the outermost peripheral position or the innermost peripheral position of the disc. It is preferable that the time required to return the reproducing transducer to the waiting position, is short. However, by the time the reproducing transducer returns to the waiting position from the outermost peripheral position of the disc, the turntable already has substantially stopped rotation. In order to perform a series of operations in which the disc is automatically raised to a height position upon loading state from above the turntable after the above operation, it is impossible to set the time required for the reproducing transducer to return to the waiting position, shorter than the time required for the turntable to substantially stop rotation. Accordingly, in order to most effectively perform the above series of operations, it is desirable to set the time required for the reproducing transducer to return to the waiting position, equal to the time required for the turntable to substantially stop rotation. Moreover, it is preferable to set the time required for the reproducing transducer to return to the waiting position from the innermost peripheral position of the disc by discontinuing reproduction, substantially equal to that required to return from the outermost peripheral position of the disc.

In addition, in order to enable a high-speed random access, and a high-speed search reproduction under tracking control, it is desirable to set the above required time within a predetermined time range by considering the quality, reproduction time, and the like of the reproduced picture.

SUMMARY OF THE INVENTION

Accordingly, a general object of the present invention is to provide a novel and useful disc-shaped recording medium reproducing apparatus in which the above described requirements have been satisfied.

Another and more specific object of the present invention is to provide a disc-shaped recording medium reproducing apparatus constructed so that the operations performed within the reproducing apparatus is performed at high-speeds by the operation of a play switch until a disc-shaped recording medium is placed on a turntable from a clamping position, and a reproducing transducer is then moved from a waiting position to a program signal starting position of the disc-shaped recording medium at a semi-high speed or a fast speed, to perform reproduction. According to the reproducing apparatus of the present invention, the reproducing transducer is moved at the above fast speed upon a fast-forward reproduction while performing tracking, and when the reproducing transducer is to be returned to the waiting position during a reproduction mode, the reproducing transducer is moved from a reproducing position to the program signal starting position of the disc-shaped recording medium at a high speed, and further, the reproducing transducer is moved at the semi-high speed or fast speed until reaching the waiting position, and the operation in which the disc-shaped recording medium is moved to a position upon loading from the turntable is performed at the above high speed or semi-high speed, where the above speeds are controlled by controlling the rotational speed of a motor.

Other objects and further features of the present invention will be apparent from the following detailed description when read in conjunction with the accompanying drawings.

DETAILED DESCRIPTION

Figure 1:
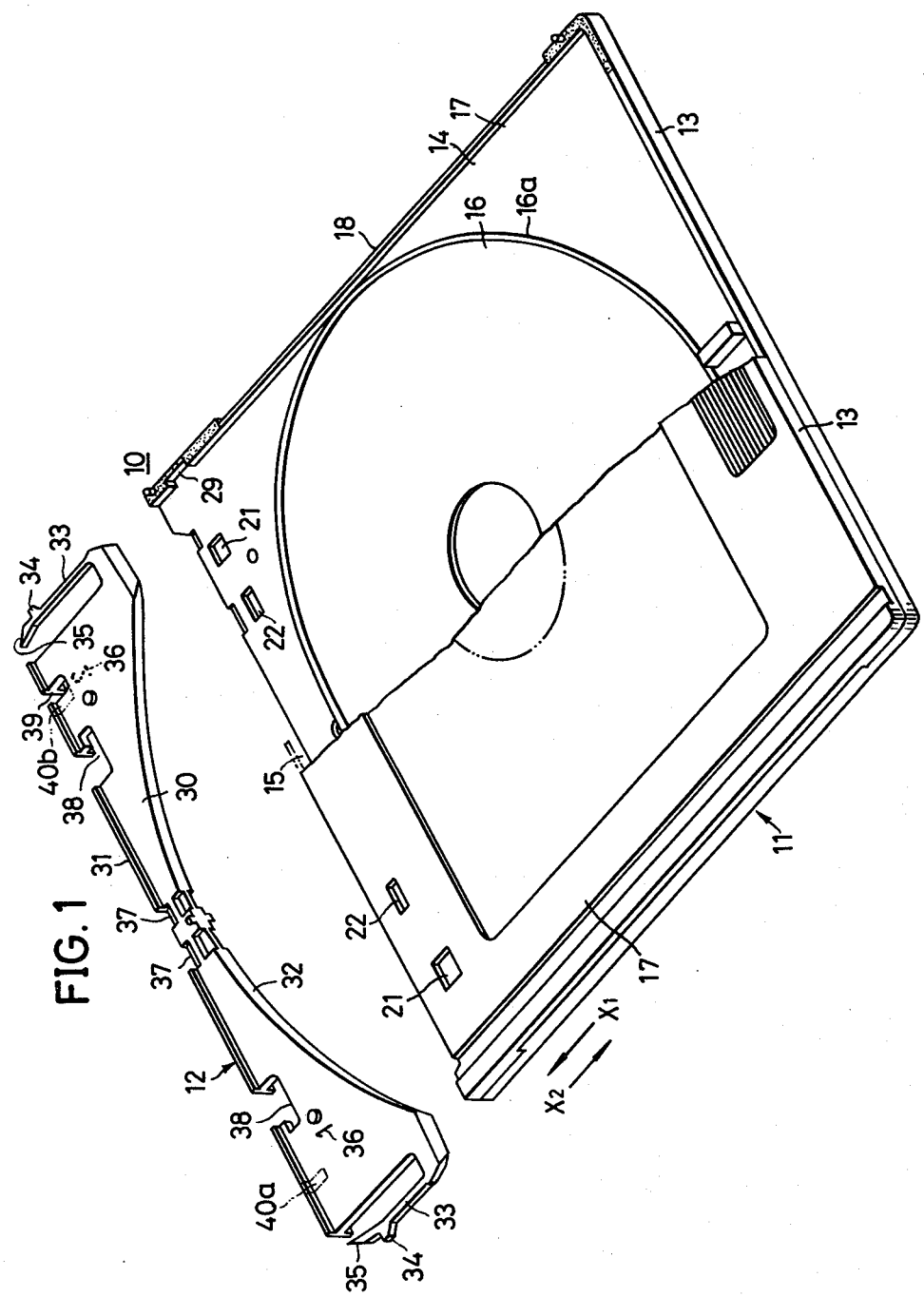
FIG. 1 is a perspective view showing an example of a disc case which operates together with a disc reproducing apparatus according to the present invention, with a part cut away and disassembled.

FIG. 1 shows an example of a disc case which operates together with a disc reproducing apparatus of the present invention, where a disc case 10 comprises a jacket 11 and a lid plate 12.

The jacket 11 is assembled from a pair of jacket halves 13 and 13, and comprises a flat cavity or space 14 therein. This space 14 is open at an opening 15 at the front side of the jacket 11 and is closed on the other three sides, and accommodates a disc 16. The jacket halvess 13 are, for example, made of styrol resin, and have a preferable flexibility so as to allow the enlarging of the opening 15, and also have a suitable hardness to protect the disc 16 accommodated therein.

Each of the jacket halves 13 comprises a flat plate part 17 and ribs 18 which are unitarily formed with the flat plate part 17 and are continuous in the three sides. A display window 21 and a pair of engaging windows 22 are provided on the flat plate part 17. The lid plate 12 comprises a plate-shaped main lid body 30 which is inserted into the front portion of the space 14 through the opening 15 of the jecket 11 and closes the opening 15, and a rim portion 31 formed unitarily at the front edge of the main lid body 30, which is fixed to the front edge of the jecket 11 and does not enter within the opening 15. The lid plate 12 is, for example, made of acrylonitrile butadiene styrene (ABS) resin.

An arcuate part 32 having a radius of curvature larger than the radius of the disc 16, is formed at the rear end part of the main lid body 30. A pair of engaging arms 33 are formed on both sides of the main lid body 30. A projection 34 which engages with a depression 29 of the jacket 11, is provided at the outer side on each of the engaging arm 33, and a sloping surface 35 is formed at the tip end on each of the engaging arm 33. The base portions of the engaging arms 33 are unitarily formed on the rear end of the main lid body 30 and extend in the forward direction, while the free ends of the engaging arms 33 can undergo resilient distortion. Upon insertion of the lid plate 12 into a predetermined position within the jecket 11, the projection 34 engages into the depression 29 in the side wall of the jecket 11, due to the flexibility of the engaging arm 33. Accordingly, the lid plate 12 is prevented from slipping out from the jecket 11.

A display 36 which displays a "1" or a "2" (or, "A" or "B") to indicate the side of the disc 16, is respectively provided at a position corresponding to the position of the display window 21, on the upper and lower surfaces of the main lid body 30. Clamping finger ride-over parts 37 are respectively formed at the central parts of the main lid body 30 so that a clamping finger of the reproducing apparatus can easily ride over the clamping finger ride-over parts 37.

A pair of L-shaped cutouts 38 are formed at the front end of the main lid body 30 through the rim portion 31. As will be described later, a lid plate locking finger and jecket opening enlarging finger of the reproducing apparatus are inserted into the cutouts 38. Further, a cutout 39 wherein a disc surface discriminating switch is inserted, is formed at the outer side of one of the cutouts 38, extending from the rim portion 31 into the main lid body 30.

Figure 2:
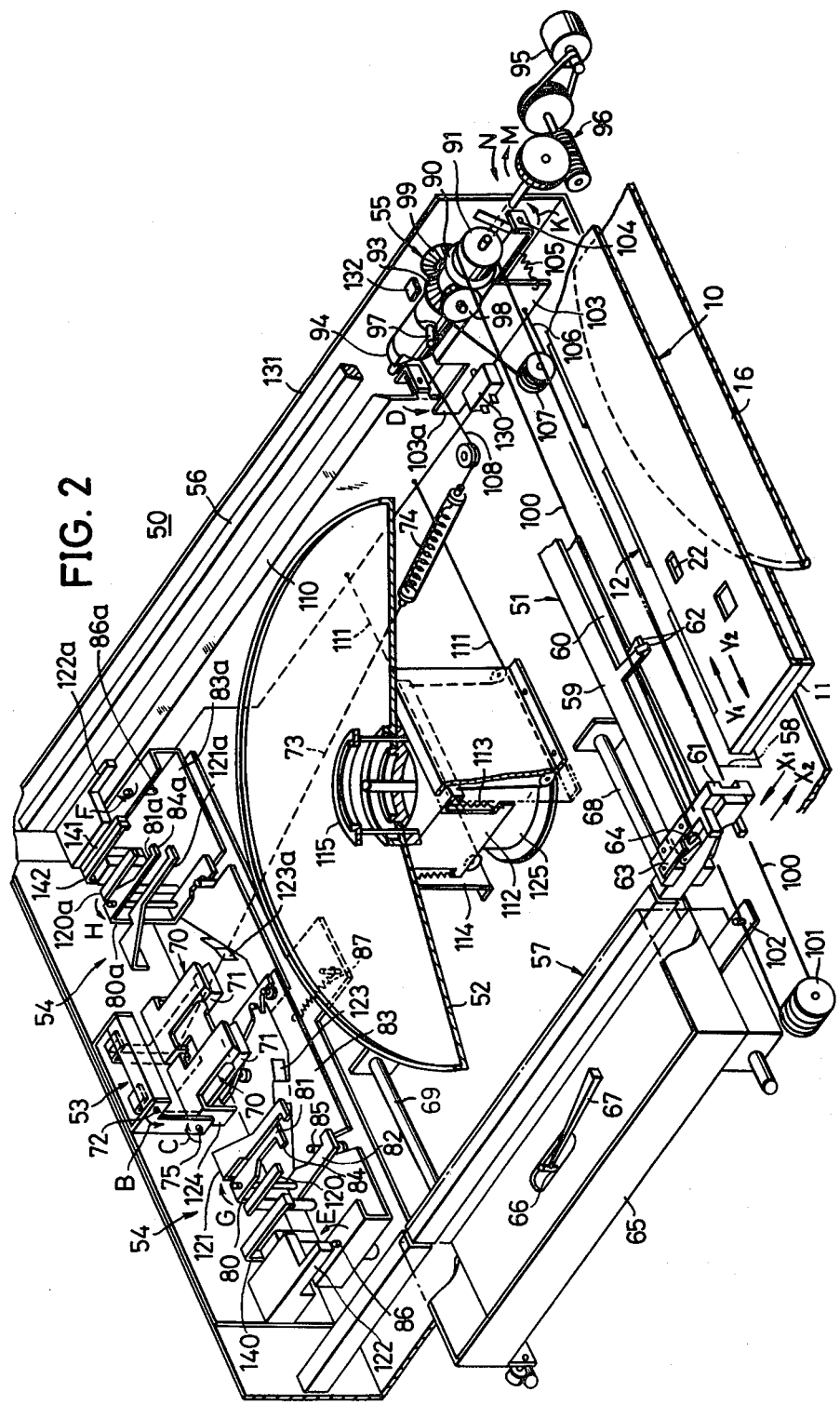
FIG. 2 is a perspective view showing the inner construction of a disc reproducing apparatus according to the present invention, with a part cut away.
Figure 3:
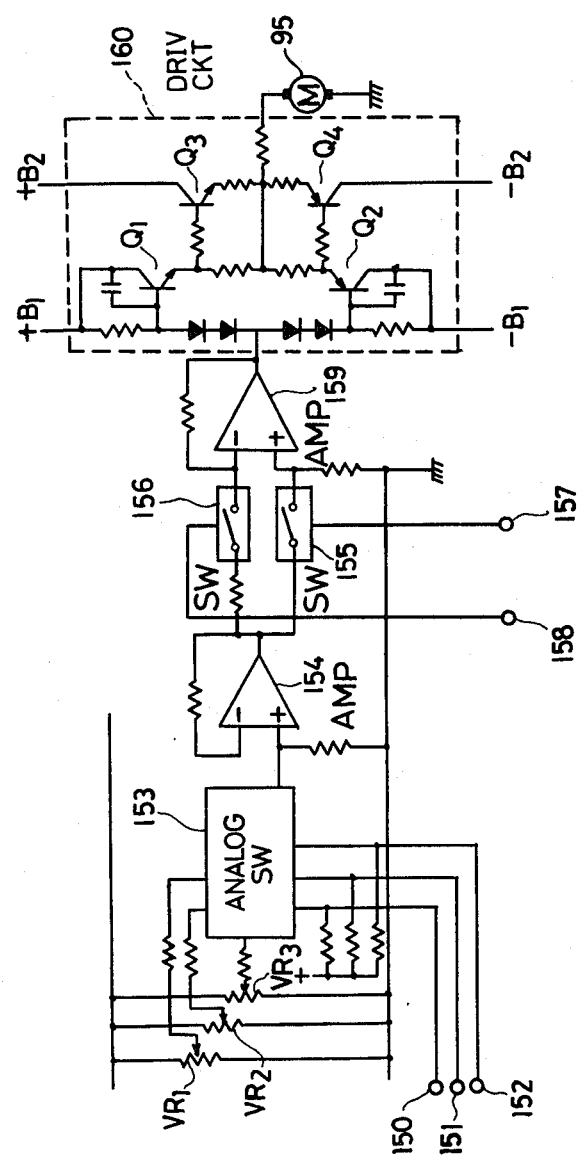
FIG. 3 is a circuit diagram showing an essential part of the reproducing apparatus according to the present invention.

As shown in FIG. 2, a reproducing apparatus 50 substantially comprises a jacket opening enlarging mechanism 51, a turntable 52 to rotate the disc 16 positioned thereon, a disc clamping mechanism 53 for clamping the disc 16, a lid plate locking mechanism 54 for locking the lid plate 12, a differential gear device 55, and the like.

Both sides of the jecket opening enlarging mechanism 51 are guided by guide rails 56 and 57, and the enlarging mechanism 51 moves between the innermost part of the reproducing apparatus 50 and a disc case inserting opening 58 provided at the frame of the reproducing apparatus 50, in the directions of the arrows X1 and X2. Upper and lower beams 59 and 60 extend in the directions of the arrows Y1 and Y2 as shown in FIG. 2, and both ends of the respective beams 59 and 60 are supported by supporting members (sliders) 61 (one of the sliders is not shown). These sliders 61 are respectively fixedly inserted into the guide rails 56 and 57. Enlarging fingers 62 are respectively formed on each of the beams 59 and 60, in a direction facing the inserting opening 58 of the reproducing apparatus 50. When the enlarging fingers 62 are positioned on the side of the inserting opening 58, a roller 64 enters inside a tapered depression, due to the action of a leaf spring 63. When the beams 59 and 60 move in the direction of the arrow X1, the roller 64 rides over the tapered depression, and the enlarging fingers 62 rotate in upward and downward directions so as to mutually separate from each other.

A pickup frame 65 is provided with a reproducing stylus 66 and a cantilever 67, and moves in the directions of the arrows Y1 and Y2 along guide rods 68 and 69.

The disc clamping mechanism 53 and the lid plate locking mechanism 54 are constructed symmetrically on the left and right sides with respect to a line which passes through the center of the turntable in the direction of the arrow X1. The parts on one side are designated by the same reference numerals as the corresponding parts on the other side, with a subscript "a", and their description will be omitted.

The disc clamping mechanism 53 is provided at the inner part of the reproducing apparatus 50 on the opposite side of the inserting opening 58, and comprises a pair of upper and lower clamping fingers 70 and 71. The lower clamping finger 71 is axially supported by a shaft 72. A wire 73 is connected to the clamping finger 71, and the clamping finger 70 receives a rotational force in the direction of arrow B due to a force of a spring mechanism 74. Accordingly, the clamping finger 70 receives a force urging rotation in the upward direction. The upper clamping finger 70 is axially supported by a pin 75.

In the lid plate locking mechanism 54, a locking member 80 comprises an upper locking finger 81 and a lower cam finger 82, and is axially supported by a pin embeddedly formed on a main lever 83. An L-shaped part 84 is formed at the tip end of the locking finger 81, and a cam which operates together with a pin 85 is formed on the cam finger 82.

The main lever 83 is axially supported by a shaft 86, and is urged to rotate in the clockwise direction by a spring 87. Furthermore, the main lever 83 is linked to the other main lever 83a and the two levers 83 and 83a rotate in mutually opposite directions.

In the differential gear device 55, a bevel gear 90 and a drum 91 are unitarily constructed, and are rotatably supported by a driving shaft 92. Similarly, a bevel gear 93 and a take-up drum 94 are unitarily constructed, and are rotatably supported by the driving shaft 92. The take-up drum 94 comprises a tubular part and a semi-circular cross section part. The driving shaft 92 is rotated by a D.C. motor 95 through a worm gear mechanism 96.

A pickup frame moving wire belt 100 is strung between the drum 91 and a drum 101 (a part therebetween is omitted in FIG. 2). An arm 102 which projects out from the pickup frame 65, is fixed to a part of the wire belt 100.

A rotary plate 103 is axially supported by a shaft 104, and is urged to rotate in the direction of arrow K by a spring 105. A wire 106 is strung between the rotary plate 103 and a pin 97 embedded in the take-up drum 94, through a pulley 107.

A wire 108 is wound and fixed to the semi-circular cross section part of the take-up drum 94. In addition, the above spring mechanism 74 is provided between the wires 108 and 73.

Upon reproduction of the disc 16, the disc case 10 is inserted through the inserting opening 58 of the reproducing apparatus 50, by inserting the disc case 10 with the side of the lid plate 12 into the direction of the arrow X1. When the jacket opening enlarging mechanism 51 is pushed and moved in the direction of the arrow X1 by the disc case 10, the roller 64 slips out of the tapered part to rotate the upper and lower beams 59 and 60, and the enlarging fingers 62 thus respectively move in directions to mutually separate from each other. Accordingly, the tip ends of the enlarging fingers 62 engage with the engaging windows 22 of the jacket 11, and enlarge the front part of the upper and lower jacket halves 13 upwards and downwards, to enlarge the opening 15.

Furthermore, a sloping surface of a rotary plate 110 is pushed by a roller (not shown) provided on the slider, and the rotary plate 110 rotates in the direction of the arrow D, due to the movement of the jacket opening enlarging mechanism 51. Accompanied by the rotation of the rotary plate 110, a wire 111 is pulled, and a push-up plate 112 is accordingly pulled downwards. Four corners of the push-up plate 112 are suspended and supported by springs 113 with respect to a support plate 114. Due to the downward movement of the push-up plate 112, a push-up body 115 which is capable of unitarily rotating with the turntable 52 and moving up and down, moves downwards, to retreat from the insertion passage of the disc case 10.

When the disc case 10 is inserted into the innermost part of the reproducing apparatus 50 together with the enlarging mechanism 51 through the upper side of the turntable 52, the ride-over parts 37 of the lid plate 12 enter between clamping parts which are positioned mutually opposite to the clamping fingers 70 and 71, and pass through these clamping parts by pushing and spreading these parts. The clamping fingers 70 and 71 close after the ride-over parts 37 of the lid plate 12 have passed through, and the clamping parts accordingly clamp the groove guard 16a of the disc 16.

Accompanied by the insertion of the disc case 10, the locking fingers 81 and 81a relatively enter inside the cutouts 38 of the lid plate 12, and the rim portion 31 accordingly pushes contact fingers 120 and 120a. When the contact fingers 120 and 120a are pushed by the lid plate 12, the main levers 83 and 83a respectively rotate in the directions of the arrows E and F. Due to the above rotation of the main lever 83, the cam of the cam finger 82 is guided by the pin 85, and the locking member 80 accordingly rotates in the direction of the arrow G. Similarly, the locking member 80a rotates in the direction of the arrow H due to the rotation of the main lever 83a. Hence, the locking fingers 81 and 81a rotate in directions so as to mutually separate from each other, and the L-shaped parts 84 and 84a provided at the tip ends of the above locking fingers 81 and 81a respectively enter into the innermost parts of the cutouts 38, to lock the lid plate 12. The lid plate 12 is restricted of its movement in the direction of the arrow X1 by the contact fingers 120 and 120a, and the lid plate 12 is thus locked and s supported at the innermost part of the reproducing apparatus 50 in a state in which the lid plate 12 is placed and supported on supporting fingers 121 and 121a.

Furthermore, engagement releasing members 122 and 122a enter inside the openings on the left and right sides of the disc case 10, and push the sloping surfaces 35 at the tip ends of the engaging arms 33. Accordingly, the engaging arm 33 respectively are distorted inwards, and the projections 34 respectively slip out from the depressions 29, to release the engagement of the lid plate 12 with respect to the jacket 11.

When the main levers 83 and 83a rotate to positions where they are latched, leaf springs 123 and 123a respectively provided at the bent parts of the main levers push against a vertically extending part 124 of the upper clamping fingers 70. Hence, a rotational force in the direction of the arrow C is applied to the clamping fingers 70. Thus, the disc 16 is clamped at a predetermined height by the lower clamping finger 71 and the upper clamping fingers 70.

Accordingly, when the disc case 10 is inserted into the final position, the engagement of the lid plate 12 with respect to the jacket 11 is released, and the disc 16 thus becomes clamped by the clamping fingers 70 and 71.

Next, the jacket 11 is pulled out in the direction of the arrow X2. Since the lid plate 12 and the disc 16 are respectively locked and clamped as described above, only the jacket 11 is moved in the direction of the arrow X2, leaving behind the lid plate 12 and the disc 16. Accompanied by this pulling out of the jacket 11, the lid plate 12 and the disc 16 are relatively pulled out from within the jacket 11. Because the opening 15 of the jacket 11 is in an enlarged state then, there is no possiblity of the disc 16 being scratched by sliding against the inner surfaces of the jacket 11.

Accompanied by the movement of the jacket 11 in the direction of the arrow X2, the jacket opening enlarging mechanism 51 also moves together with the jacket in the direction of the arrow X2, since the step part of the jacket opening enlarging fingers 62 engages with the engaging windows 22 of the jacket 11. When the jacket 11 is pulled out to the vicinity of the inserting opening 58, the rotary plate 110 rotationally returns due to a spring and the push-up body 115 moves up to support the center part of the disc 16. Furthermore, when the jacket 11 is pulled out, the disc 16 completely separates from the jacket 11, the jacket opening enlarging mechanism 51 returns to its original position, and the jacket opening enlarging fingers 62 rotate in directions so as to mutually close upon each other and separate from the engaging windows 22. The jacket 11 returns to its original state due to its flexibility, and the enlarged opening 15 also returns to the original state, and the jacket 11 is completely pulled out from the reproducing apparatus 50. In this state, the disc 16 is supported horizontally at a position above the turntable 52, by the clamping fingers 70 and 71 and the push-up body 115. In this state, a detection switch 130 is pushed by the rotary plate 103 and turned ON.

When a play button (not shown) is then pushed, the motor 95 starts to rotate, and the driving shaft 92 rotates in the direction of the arrow M. Accordingly, the bevel gear 93 and the take-up drum 94 having small loads are first rotated in the direction of the arrow M, and the wire 108 is loosened. Thus, the clamping of the disc by the disc clamping mechanism 53 is released. In addition, the wire 106 is loosened due to the rotation of the drum 94, and the rotary plate 103 rotates in the direction of the arrow K due to the spring 105. Therefore, the rotary plate 110 is pushed by the extending arm 103a of the rotary plate 103, and the push-up body 115 moves downwards. Hence, the disc 16 which is released from the clamping moves downwards at high speed together with the push-up body 115, accompanied by the rotation of the motor 95 and is placed on the turntable 52.

When the take-up drum 94 rotates by a predetermined angle, the pin 97 hits a fixed fin 132 fixed on a right side wall 131, to limit the rotation. Thus, the rotational load of the bevel gear 93 and the take-up drum 94 become larger than that of the bevel gear 90 and the drum 91, and the bevel gear 90 and the drum 91 then start to rotate in the direction of the arrow M. Due to this rotation of the drum 91, the wire 100 travels, and the pickup frame 65 is thus moved in the direction of the arrow Y1.

When the pickup frame 65 starts to move, the pickup frame 65 separates from the actuator of a switch (not shown) which had been pushed and opened by the pickup frame 65, to close this switch. Hence, a motor 125 starts to rotate, and the disc 16 placed on the turntable 52 rotates together with the turntable 52.

The pickup frame 65 is moved at a semi-high speed or a fast speed to a reproduction starting position on the disc 16, due to the rotation of the motor 95.

In the present embodiment of the invention, "a fast speed" refers to a speed where the pickup frame 65 can be moved from the outermost peripheral position to the innermost peripheral position of the disc 16 within a time under one minute, and this speed is much faster than that upon normal reproduction. The fast speed is selected to a speed which is approximately one-twelfth the speed of a high speed, for example, which will be described later. Moreover, when the above time is set to approximately twenty to thirty seconds, the reproduced picture does not become indistinct, and is highly desirable in that less time is required.

In addition, in a case where N tracks are formed on the disc 16, and signals used for random access are recorded for an interval of T in one track, in the present embodiment of the invention, "a high speed" refers to a speed where the pickup frame 65 can be moved from the outermost peripheral position to the innermost peripheral position of the disc 16 within a time between NT (seconds) and 2NT (seconds). There are, for example, 56,000 tracks formed on one side of the disc 16, and when reproducing a disc wherein signals used for random access are recorded for forty micro-seconds on one track, the pickup frame 65 is moved from the outermost position to the innermost position of the disc under five seconds according to the above high speed.

The motor 95 reverses rotation upon finishing of the reproduction, or upon reproduction discontinuing operation during reproduction. Accordingly, the driving shaft 174 also starts to rotate in the opposite direction as the above, namely, in the direction of the arrow N, and the bevel gears 90 and 93 are urged to rotate in the same direction, that is, in the direction of the arrow N. The rotation of the bevel gear 93 accompanies an operation in which the rotary plate 103 is rotated against the powerful force exerted by the spring 105, and hence, the rotational load of the bevel gear 93 becomes larger than that of the bevel gear 90. Thus, the bevel gear 90 starts to rotate in the direction of the arrow N, and the pickup frame 65 is moved in the direction of the arrow Y2 at high speed.

The pickup frame 65 returns to the waiting position, and is held by a stopper (not shown). Therefore, the rotational load becomes large since the bevel gear 90 stops rotating, and the bevel gear 93 then starts to rotate in the direction of the arrow N. Accompanied by this rotation of the bevel gear 93, the tubular part 94 takes up the wire 106, and the rotary plate 103 starts to rotate against the spring 105. Accordingly, the push-up body 115 rises as in the case described above. Furthermore, as in the case above, the semi-circular cross section part of the tubular part 94 takes up the wire 108 after a slight delay, and the lower clamping finger 71 rotates to clamp the disc 16 between the upper clamping fingers 70.

The wire 108 is taken up until a spring within the spring mechanism 74 alightly further pulls on the wire 108, and the disc clamping force is accordingly applied. At the final point, the semi-circular cross section part of the tubular part 94 takes up the wire 108 by a strong force. In addition, the motor 95 stops when the rotary plate 103 pushed the detection switch 130.

Furthermore, when the pickup frame 65 returns to the waiting position from the reproduction finishing position or a reproduction discontinuing position, the pickup frame 65 is moved at a high speed from the reproduction finishing position or the reproduction discontinuing position to the outermost peripheral position of the disc 16, and moved at a semi-high speed or a fast speed from the outermost peripheral position to the waiting position.

Next, the description will be given on one embodiment of a circuit for controlling the rotational speed of the motor 95 used for performing the above described operation with the above speed. Signals indicating the feeding state of the pickup frame 65, are supplied to an analog switch 153 from terminals 150 and 151. Sliders of variable resistors VR1, VR2, and VR3 are connected to the analog switch 153. The analog switch 153 selectively changes over the voltages obtained from the sliders of the variable resistors VR1 through VR3 and supplies the voltage to a non-inverting input terminal of an operational amplifier 154, according to the signals applied to the terminals 150 and 151. The voltage obtained from these variable resistors VR1 through VR3 are selected to voltages which sets the rotational speed of the motor 95 at speeds which will result in an operation performed with the above high speed, semi-high speed, and fast speed.

Hence, the rotational speed of the motor 95 is controlled so that, the disc 16 is lowered onto the turntable 52 at a high speed, the pickup frame 65 is moved from the waiting position to the reproduction starting position on the disc 16 at a semi-high or a fast speed upon starting of the reproduction, the pickup frame 65 is moved at a fast speed upon a high-speed search, the pickup frame 65 is moved to the outermost peripheral position of the disc at a high speed and then moved to the waiting position at a semi-high speed or a fast speed upon finising or discontinuing of the reproduction, and the disc 16 is raised above the turntable 52 at a high speed. Signals which are formed by a micro-computer (not shown) so as to control the rotational speed of the motor 95 in the above described manner, are applied to the terminals 150 and 151.

The output signal of the operational amplifier 154 is supplied to either a non-inverting input terminal or an inverting input terminal of an operational amplifier 159 through one of switching circuits 155 and 156. The switching circuit 155 is turned ON by a control signal from a terminal 157 upon forward mode. Thus, the output of the operational amplifier 154 is supplied to the non-inverting input terminal of the operational amplifier 159, and is not inverted upon amplification. Further, the switching circuit 156 is turned ON by a control signal from a terminal upon backward mode. Hence, the output of the operational amplifier 154 is supplied to the inverting input terminal of the operational amplifier, and is inverted upon amplification. The output signal of the operational amplifier 159 is supplied to the motor 95 through a driving circuit 160 including transistors Q1 through Q4.

The rotational speed of the motor 95 is controlled so that the above described operations are performed at one of the three speeds, that is, the high speed, semi-high speed, and fast speed, according to the switchover of the analog switch 153 due to the signals applied to the terminals 150 and 151.

Since a large force is required to raise the disc 16 from the turntable 52 by the push-up body 115, in a case where it is desirable to use the motor 95 in a state in which the torque is large, the motor 95 can be rotated at the semi-high or the fast speed.

Furthermore, when performing a random access to a position having a predetermined address where the address greatly differs from where the pickup frame 65 is positioned, the motor 95 can be controlled so that the motor 95 rotates at a high speed to move the pickup frame 65 at a high speed, and then rotates at a semi-high or a fast speed when the pickup frame 65 approaches in the vicinity of the desired address.

In addition, in the above embodiment of the present invention, the reproducing apparatus is constructed so that the lowering and raising of the disc 16, and the moving of the pickup frame 65 are performed by a single motor 95, however, the reproducing apparatus of the present invention is not limited to the application to a reproducing apparatus having the above construction, and can be applied to a reproducing apparatus in which separate motors are provided to perform the respective operations.

Further, this invention is not limited to these embodiments but various variations and modifications may be made without departing from the scope of the invention.

What is claimed is:

1. Apparatus for reproducing a disc-shaped recording medium which is accommodated within a case, said case comprising a jacket which has a space for accommodating said disc-shaped recording medium and an opening for enabling said disc-shaped recording medium to go into and out of said jacket, and a lid member inserted through said opening of said jacket for closing said opening of said jacket, said lid member having cutouts and ride-over parts, said reproducing apparatus comprising:

means defining an inserting opening through which said case may be inserted;

turntable means for rotating said disc-shaped recording medium;

clamping means provided at an innermost part on a side opposite said inserting opening with respect to said turntable means, for clamping at least one of said disc-shaped recording medium and said lid member at a clamping position;

reproducing transducer means for reproducing said disc-shaped recording medium;

displacing means for displacing said disc-shaped recording medium to a position where said disc-shaped recording medium is placed on said turntable means and reproduced by said reproducing transducer means from said clamping position upon a starting of the reproduction and displacing said disc-shaped recording medium to said clamping position from said turntable means upon finishing or discontinuing the reproduction;

moving means for moving said reproducing transducer means from a waiting position to a reproducing position with respect to the disc-shaped recording medium;

driving source means comprising a single motor, for operating said moving means;

means for selectively changing over and transmitting the driving force of said driving source means via mechanical coupler means to said displacing means and said moving means;

means for rotating said turntable after said disc-shaped recording medium is placed onto said turntable means; and controlling means for controlling said driving source means to operate said moving means at a speed which is selected from among a high speed, semi-high speed, and fast speed according to the operation mode of said reproducing apparatus.

2. The reproducing apparatus as claimed in claim 1 in which said displacing means comprises means for lowering and raising the disc-shaped recording medium, said controlling means controls said driving source means to lower said disc-shaped recording medium at a high speed by said displacing means.

3. A reproducing apparatus as claimed in claim 1 in which said controlling means controls said driving source means to move said reproducing transducer means from a waiting position to a reproduction starting position on said disc-shaped recording medium at a semi-high speed or a fast speed by said moving means.

4. A reproducing apparatus as claimed in claim 1 in which said controlling means controls said driving source means to move said reproducing transducer means at a fast speed by said moving means, in a mode where said reproducing transducer means performs a high-speed search while reproducing.

5. A reproducing apparatus as claimed in claim 1 in which said controlling means controls said driving source means to move said reproducing transducer means from a reproduction finishing position or a reproduction discontinuing position to a position in the vicinity of an outermost peripheral position of said disc-shaped recording medium at a high speed upon finishing or discontinuing of the reproduction, and then move said reproducing transducer means to said waiting position at a semi-high speed or a fast speed by said moving means.

6. A reproducing apparatus as claimed in claim 1 in which said high speed is a speed which enables said reproducing transducer means to move from the outer periphery to the inner periphery of said disc-shaped recording medium within a time between NT and 2NT by said moving means, where N is the total number of tracks on said disc-shaped recording medium and T is an interval of a signal used for random access which is recorded in each track.

7. A reproducing apparatus as claimed in claim 1 in which said fast speed is selected at a speed which is approximately one-twelfth said high speed.

* * * * *